Sept. 14, 1954     C. W. LINCOLN     2,688,885
BALL NUT AND LEVER STEERING GEAR
Filed Oct. 18, 1951     2 Sheets-Sheet 2

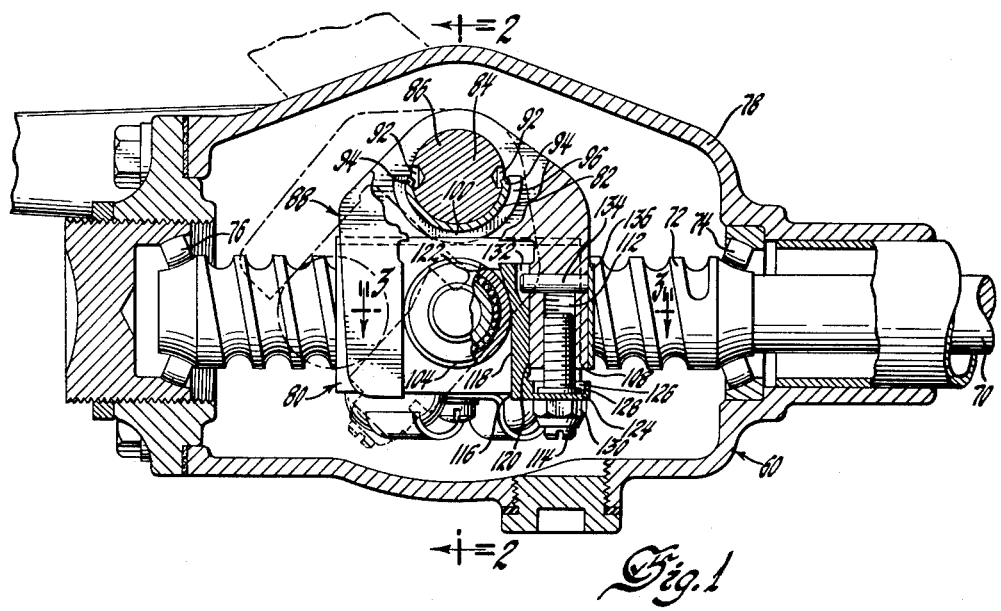
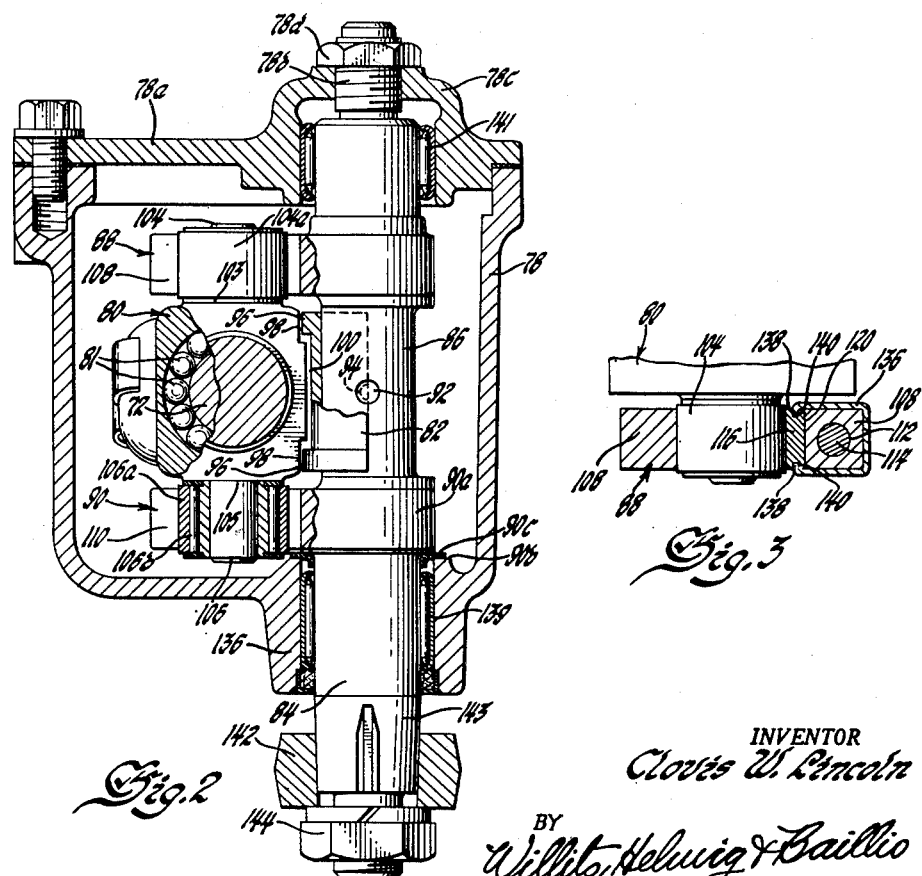

INVENTOR
Clovis W. Lincoln
BY
Willits, Helwig & Baillio
ATTORNEYS

Patented Sept. 14, 1954

2,688,885

UNITED STATES PATENT OFFICE 2,688,885

BALL NUT AND LEVER STEERING GEAR

Clovis W. Lincoln, Saginaw, Mich., assignor to General Motors Corporation, Detroit, Mich., a corporation of Delaware Application October 18, 1951, Serial No. 251,894

14 Claims. (Cl. 74—499)

1

This invention relates to steering gears for motor and other types of vehicles and more particularly to steering gears of the ball nut and lever type.

In steering gears of the ball nut and lever type anti-friction means are provided between the contacting parts thereof to reduce friction and thereby enable efficient operation thereof. In order to reduce friction to a minimum, clearance must be provided between yokes mounted on the pitman shaft and the trunnions on the ball nut. This clearance in some cases may cause undesirable lost motion between the yokes and trunnions when the steering gear is in its centered position. Another difficulty encountered in prior constructions is the tendency of the steering gear to move past its centered position during movement of the steering wheel to straighten the vehicle after a turn has been effected.

One object of the present invention is to provide a novel and improved steering gear which is so constructed that substantially no lost motion exists between the nut and pitman shaft when the steering gear is in its centered position.

Another object is to provide in a steering gear of the stated character means for dampening the movement of the operating parts as they approach their centered position.

A further object is to provide in a steering gear of the ball nut and lever type, anti-friction means between the engaging parts thereof whereby maximum efficiencies in operation are obtained.

A more specific object is to provide in a steering gear of the ball nut and lever type, a pair of anti-friction trunnions on the ball nut engageable with yokes secured to the pitman shaft and to provide adjustable ramp means on at least one of the arms of said yokes which is adapted to engage the associated trunnion when the steering gear is in centered position thereby preventing lost motion between the said trunnion and yoke when the steering gear is in said centered position of adjustment.

A still further object is to provide means between the ball nut and the pitman shaft of a ball nut lever type of steering gear which prevents undue turning of the nut about the worm.

A still further object is to provide a steering gear of the stated character which is simple in construction, economic in manufacture and highly efficient in operation.

Other and further objects will become apparent as the description of the invention progresses.

Of the drawings:

Fig. 1 is a longitudinal sectional view taken through the lower extremities of a steering shaft showing the construction of the ball nut and lever and the specific operating connections therebetween, certain parts being broken away to more clearly show the structure of certain elements thereof.

Fig. 2 is a transverse sectional view taken substantially along line 2—2 of Fig. 1.

Fig. 3 is a sectional view taken substantially along line 3—3 of Fig. 1.

Figures 4, 5:
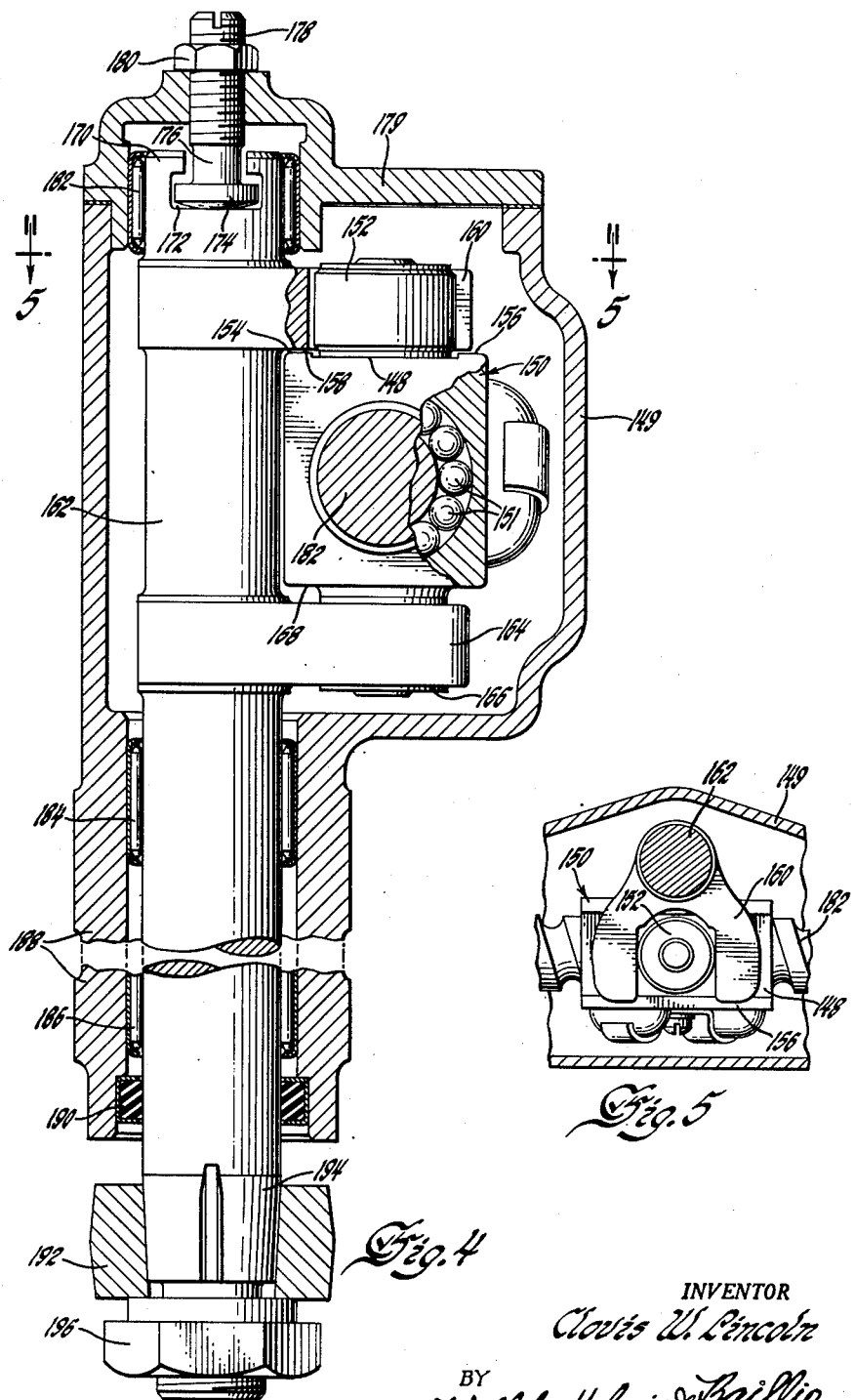
Fig. 4 is a transverse sectional view similar to Fig. 2 but showing a modified construction.
Fig. 5 is a fragmentary view partly in section taken substantially along line 5—5 of Fig. 4.

Referring to the drawings the numeral 60 indicates generally a portion of a steering gear of the ball nut and lever type comprising a steering shaft 70 having a worm 72 provided at one end thereof. The worm portion 72 of shaft 70 is mounted in thrust roller bearings 74 and 76 provided at the opposite ends of an enclosing housing 78. Mounted on worm 72 is a ball nut structure 80 which is adapted for substantially non-rotatable movement between the ends of worm 72. The specific construction of worm 72 and ball nut 80 and the method of operation thereof is old in the art and, accordingly, a detailed description thereof will not be given herein. For a complete disclosure of such a mechanism reference may be had to United States Patent 2,380,-662 granted to R. P. Means, Jr., on July 31, 1945. Suffice it to say that upon rotation of shaft 70 in one direction nut structure 80 will move to the left (Fig. 1) and upon actuation of said shaft in the reverse direction the nut structure will move to the right, the balls 81 disposed between the said nut and worm providing a highly efficient anti-friction bearing therefor. Mounted at the opposite sides 103 and 105 of nut structure 80 and in axial alignment are a pair of anti-friction trunnions 104 and 106. Anti-friction trunnions 104 and 106 extend into spaced yokes or bifurcated arms 88 and 90, respectively, secured to and extending outwardly from a pitman shaft 84. As shown in Fig. 2, a roller 106a is mounted in a needle-type roller bearing 106b provided on trunnion 106. Trunnion 104 has a similar anti-friction roller 104a mounted thereon. Pitman shaft 84 is disposed at substantially right angles to worm 72 and is mounted at one end in a needle-type roller bearing 141 provided in the cover 78a of housing 78 and at the other end in a second needle type roller bearing 139 provided in the tubular extension 136 of said housing. Pitman shaft 84 is held against axial movement in one direction by a stud bolt 78b making threaded engagement with a tapped opening provided in the offset portion 78c of cap 78. Bolt 78b is secured in adjusted position by a lock nut 78d. The pitman shaft 84 is held against axial movement in the opposite direction by the flange portion 90a of arm 90. Flange 90a lies adjacent an annular boss 90b provided interiorly of casing 78, a gasket or washer 90c being provided between said flange and boss. A pitman arm 142 is splined to the lower end 143 of pitman shaft 84 and is held thereon by lock nut 144.

The anti-friction trunnions 104 and 106 and the arms 108 and 110 of yokes 88 and 90, respectively, are so designed that a very slight amount of clearance is provided therebetween. Consequently, upon axial movement of nut 80 along worm 72, rolling contact is provided between said trunnions and the arms of yokes 88 and 90.

In order to prevent turning of nut structure 80 about worm 72 during operation of the device, a semicylindrical member 82 is mounted on the portion 86 of pitman shaft 84 disposed between the forked arms 88 and 90 thereof. The portion 86 of pitman shaft 84 has provided intermediate the ends thereof a pair of diametrically opposed circular recesses 92. The portions of the edges of semicylindrical member 82 lying adjacent to recesses 92 are punched inwardly, as shown at 94, so as to enter said recesses slightly thereby effectively securing said member on the pitman shaft 84. Semicylindrical member 82 has provided near each end thereof a semicylindrical flange 96 which is adapted to lie in slightly spaced relation with a smooth, flat offset portion 98 provided on the inner surface 100 of nut structure 80. The flanges 96 cooperate with the smooth surfaces 98 on nut structure 80 to prevent undue turning of the latter about worm 72 during travel thereof in either direction along the said nut. Binding or scuffing of the trunnions and the bifurcated arms on pitman shaft 84 is thus prevented and proper operation is assured under all conditions of operation.

One of the arms 108 and 110 of each of the forked arms or yokes 88 and 90 is provided with adjustable means to take up the clearance between the trunnions 104 and 106 and the said forked arms when the steering gear is in centered position. Inasmuch as the structure of the adjustable means provided on each of the arms 108 and 110 is identical, a description of the adjustable means associated with one of the arms 108 will suffice for both.

Arm 108 of forked arm 88 is provided with an internally threaded bore 112 for receiving a retaining bolt 114 for a longitudinally adjustable member 116. As shown more particularly in Fig. 1, member 116 is of substantially L-shaped construction having one leg 118 abutting the inner surface 120 of arm 108. The outer surface of leg 118 is adapted to engage trunnion 104 and for the greater part of its length lies in substantially parallel relation with the inner surface of the oppositely disposed arm 108 of yoke 88. Leg 118 of yoke 88 terminates at its inner end in a ramp 122. The other leg 124 of adjustable member 116 is disposed at substantially right angles to leg 118 and is provided with an opening centrally thereof for receiving bolt 114. The inner surface of leg 124 is provided with a recess 126 for receiving a threaded retaining member 128. A lock nut 130 provided at the outer end of bolt 114 cooperating with retainer 128 effectively holds the outer end of adjustable member 116 against movement. The upper end of the inner surface of leg 118 has provided therein a slot 132 which receives the inner end of a pin 134 extending through a transverse opening provided in arm 108. The adjustable member 116 is guided for movement lengthwise of arm 108 by a substantially U-shaped retaining member 136. The inner edges of retaining member 136 are provided with inturned flanges 138 which extend into longitudinally disposed grooves 140 provided at the opposite sides of the leg 118 of adjustable member 116. Member 136 also engages the outer end of pin 134 to prevent movement of the latter out of recess 132. To adjust member 116, lock nut 130 is simply loosened and the bolt is then turned in the proper direction.

It is apparent that by adjusting member 116 in this manner the ramp 122 thereon may be brought into engagement with trunnion 104 when the steering gear is at or near its centered position. At this time the opposite side of trunnion 104 is in or nearly in engagement with the inner surface of the opposite arm 108 and by adjusting member 116 in this manner all slack or clearance between yoke 88 and trunnion 104 may be eliminated. A slight clearance is desirable between the trunnions and the inner surfaces of their yokes. However, it is also desirable to minimize or eliminate this clearance when the steering gear is in centered position to prevent backlash and thereby insure efficient operation.

Should it be desired to dampen the movement of the steering gear in its centered position the member 116 may be so adjusted as to cause engagement of ramp 122 with trunnion 104 just before the steering gear reaches its centered position. As the steering gear approaches centered position, pressure would then be exerted on the worm 72 by trunnion 104 resulting in dampening the movement of said steering gear. If desired, dampening movement might also be produced by enlarging the thread on worm 72 at the center thereof to preload the balls 81 when the steering gear is in centered position, the said balls otherwise being free of such loading action.

In order to compensate for wear during operation of the device, the entire contacting surface of the leg 118 of adjustable member 116 may be adjusted laterally. This may be done by simply providing inclined contacting surfaces between the inner surface of arm 108 and the inner surface of the leg 118 of adjustable member 116. By so constructing the parts, it is clear that upon adjustment of member 116 longitudinally, the latter will move laterally toward or away from the opposite arm 108 of yoke 88 depending upon the direction in which the member 116 is adjusted. A ramp similar to ramp 122 may also be provided in an adjustable member so constructed.

Figs. 4 and 5 disclose another embodiment of the invention. Instead of providing spaced flanges on the pitman shaft for preventing turning of the nut, such as the flanges 96 on member 82, the structure shown in Figs. 4 and 5 employs a somewhat different construction. As shown in Fig. 4 the side 148 of ball nut structure 150 adjacent anti-friction trunnion 152 has provided, at opposite sides of the latter, a pair of flat smooth shoulders 154 and 156 which lie closely adjacent to the under surface 158 of one of the forked arms or yokes 160 secured to the pitman shaft 162. The other forked arm or yoke 164 which receives anti-friction trunnion 166 is spaced a greater distance from the opposite side 168 of nut 150. Trunnions 152 and 166 extend between the bifurcations of arms 160 and 164, respectively, a slight amount of clearance being provided to insure proper rolling contact of said trunnions on said arms. The upper end 170 of pitman shaft 162 is provided with a T-slot 172 for receiving the head 174 and shank 176 of an adjusting bolt 178 making threaded engagement with a tapped opening provided in the cover 179 of casing 149. A lock nut 180 holds the parts in adjusted position. By adjusting bolt 178 pitman shaft 162 may be adjusted so that a slight clearance is provided between shoulders 154 and 156 on ball nut structure 150 and the inner surface 158 of yoke 160. In this construction the upper end of pitman shaft 162 is mounted in a needle-type roller bearing 182 provided in cover 179 of casing 149. The other end of shaft 162 is mounted in spaced needle bearings 184 and 186 provided in the tubular extension 188 of casing 149. A seal 190 is provided between the lower end of tubular extension 188 and shaft 162 to prevent the escape of lubricant from within the casing. A pitman arm 192 is splined to the lowermost end 194 of shaft 162 and is held in place thereon by lock nut 196.

By adjusting the pitman shaft 162 by bolt 178 as just described, proper clearance between nut 150 and arm 160 may be provided. The shoulders 154 and 156 on nut 150 function to prevent undue turning of the latter about worm 182, whereby binding and scuffing of the parts is prevented. In this construction also, when the ball nut structure 150 approaches its centered position on worm 182 it may turn slightly about worm 182 bringing one of the shoulders 154 or 156 into contact with the surface 158. This causes a slight friction between the parts but is not sufficient to in any way cause binding or scuffing of the parts. The movement of the steering gear may be dampened by simply enlarging the thread of screw 182 intermediate the ends thereof to preload the balls 151. When the nut moves away from centered position free movement of the balls 151 may take place.

From the foregoing description it is seen that novel and simplified means have been provided for preventing turning of the nut about its shaft and thereby avoiding undesirable binding or scuffing of the trunnions in the yokes. Novel means have also been provided for preventing clearance between the trunnions and the yokes when the steering gear is in centered position and also for dampening the action of a steering gear as it approaches its centered position.

While the invention has been described in connection with steering gears for motor and other vehicles, it is apparent that the invention is equally adaptable for other uses wherein power transmission is desired. It will also be apparent that the invention as shown and described herein is subject to modification and change without departing from the spirit thereof. It therefore is to be understood that it is not intended to limit the invention to the embodiments shown and described herein but only by the scope of the claims which follow.

I claim:

1. Power transmitting means comprising, a worm, anti-friction bearings for said worm, a ball nut mounted on said worm, a rock shaft disposed at substantially right angles to said worm, anti-friction bearings for said rock shaft, one or more bifurcated arms secured to said rock shaft, one or more trunnions mounted on said nut, one for each of said arms, anti-friction means on said trunnions providing rolling contact between said trunnions and said arms, and means for dampening the movement of said nut in one position of adjustment.

2. Power transmitting means comprising, a worm, anti-friction bearings for said worm, a ball nut mounted on said worm, a rock shaft disposed at substantially right angles to said worm, anti-friction bearings for said rock shaft, one or more bifurcated arms secured to said rock shaft, one or more trunnions mounted on said nut, one for each of said arms, anti-friction means on said trunnions providing rolling contact between said trunnions and said arms, means for dampening the movement of said nut in one position of adjustment, and means on said rock shaft and nut for preventing undue turning movement of said nut about said worm.

3. Power transmitting means, comprising, a worm, a nut movable on said worm and adapted for movement from a starting position thereon to positions on either side of said starting position, a rock shaft disposed at substantially right angles to said worm, a pair of spaced bifurcated arms secured to said shaft, a pair of trunnions secured to oppositely disposed sides of said nut and extending between the bifurcations of said arms, clearance being provided between said trunnions and bifurcations to prevent undue friction therebetween, and means for eliminating said clearance when said nut reaches the said starting position.

4. Power transmitting means, comprising, a worm, a nut movable on said worm and adapted for movement from a starting position thereon to positions on either side of said starting position, a rock shaft disposed at substantially right angles to said worm, a pair of spaced bifurcated arms secured to said shaft, a pair of trunnions having anti-friction rollers thereon secured to oppositely disposed sides of said nut and extending between the bifurcations of said arms, clearance being provided between said trunnions and bifurcations to permit rolling contact of said trunnions on said arms, and adjustable means for eliminating said clearance between said trunnions and bifurcations when said nut reaches the said starting position.

5. The invention set forth in claim 4 wherein said adjustable means comprises a member disposed along the inside of one of the bifurcations of at least one of said bifurcated arms and adapted to be engaged by the association of said trunnions, means for adjusting said member, and means for retaining said member in position.

6. Power transmitting means, comprising, a worm, a nut movable on said worm and adapted for movement from a starting position thereon to positions on either side of said starting position, a rock shaft disposed at substantially right angles to said worm, a pair of spaced bifurcated arms secured to said shaft, a pair of trunnions having anti-friction rollers thereon secured to oppositely disposed sides of said nut and extending between the bifurcations of said arms, clearance being provided between said trunnions and bifurcations to permit rolling contact of said trunnions on said arms, and adjustable means for eliminating said clearance between said trunnions and bifurcations when said nut reaches said starting position, said adjustable means comprising, a movable facing member disposed along the inside of one of the bifurcations of at least one of said arms having an inwardly inclining ramp portion at one end thereof adapted to engage said trunnion, and means for longitudinally adjusting said member.

7. In a steering gear, the combination of a steering shaft, a worm on said shaft, a ball nut mounted on said worm and adapted for movement from a starting position on the latter to positions on either side of said starting position, a pitman shaft disposed at substantially right angles to said worm, a pair of spaced bifurcated arms secured to said pitman shaft, anti-friction trunnions secured to and extending from opposite sides of said nut disposed between the bifurcations of said arms and in slightly spaced relation therewith, spaced arcuate means mounted on said pitman shaft for preventing undue turning of said ball nut about said worm, and means for reducing the spaces between said trunnions and the bifurcations of said arms as said nut approaches said starting position.

8. Power transmitting means comprising, a worm, a nut mounted on said worm and adapted for movement from a starting position on the latter to positions on either side of said starting position, a rock shaft disposed at substantially right angles to said worm, spaced bifurcated arms secured to said rock shaft, oppositely disposed trunnions on said nut mounted in operative relation with said arms, one side of said nut lying in close proximity to one of said bifurcated arms whereby undue turning of said nut about said worm is prevented, and means for adjusting the space between said one side of said nut and the said one of said bifurcated arms.

9. Power transmitting means comprising, a worm, a nut mounted on said worm and adapted for movement from a starting position on the latter to positions on either side of said starting position, a rock shaft disposed at substantially right angles to said worm, spaced bifurcated arms secured to said rock shaft, oppositely disposed trunnions on said nut mounted in operative relation with said arms, and widely spaced flat shoulder means on one side of said nut lying in close proximity to one of said arms, whereby undue turning of said nut about said worm is prevented.

10. Power transmitting means comprising, a worm, a nut mounted on said worm and adapted for movement from a starting position on the latter to positions on either side of said starting position, a rock shaft disposed at substantially right angles to said worm, spaced bifurcated arms secured to said rock shaft, oppositely disposed trunnions on said nut mounted in operative relation with said arms, a flat extended shoulder on said nut disposed at either side of one of said trunnions, said shoulders lying in close proximity to one of said bifurcated arms, whereby undue turning of said nut about said worm is prevented, and means for adjusting the space between said shoulders and the said one bifurcated arm.

11. Power transmitting means comprising a worm, bearing means for said worm, a traveling nut mounted on said worm and movable from a central position to positions at opposite sides of said central position, a rock shaft disposed at an angle to said worm, bearing means for supporting said shaft, arm means on said rock shaft, interengaging means on said arm means and nut for actuating said rock shaft upon movement of said nut in either direction from said central position, and means allowing for a predetermined amount of clearance between said inter-engaging means except in one position of adjustment of said nut.

12. Power transmitting means comprising, a worm, bearing means for said worm, a traveling nut mounted on said worm and adapted for translational movement from a starting position to positions on either side of said starting position, a rock shaft disposed at an angle to said worm, bearing means for supporting said rock shaft, a bifurcated arm secured to said rock shaft, a trunnion mounted on said nut and disposed between the bifurcations of said arm, and means allowing for a predetermined amount of clearance between said trunnion and bifurcations except in one position of adjustment of said nut.

13. Power transmitting means comprising, a worm, a nut mounted on said worm and adapted for movement from a starting position to positions on either side of said starting position, a rock shaft disposed at an angle to said worm, an arm secured to said rock shaft, a portion of said arm being disposed in close proximity to one side of said nut so as to prevent undue turning of said nut on said worm, interengaging means on said nut and arm whereby movement of said nut in either direction imparts movement to said rock shaft, and means allowing for a predetermind amount of clearance between said inter-engaging means except in one position of adjustment of said nut.

14. The device set forth in claim 13 including adjustable means for varying the distance between the said side of said nut and said arm.

References Cited in the file of this patent

UNITED STATES PATENTS

| Number | Name | Date |
|---|---|---|
| 695,222 | Mooers | Mar. 11, 1902 |
| 698,407 | Malicet et al. | Apr. 22, 1902 |
| 998,611 | Graef | July 25, 1911 |
| 1,343,846 | Rapson | June 15, 1920 |
| 1,706,521 | Bugatti | Mar. 26, 1929 |
| 2,045,811 | Twyman | June 30, 1936 |